Figure 1:
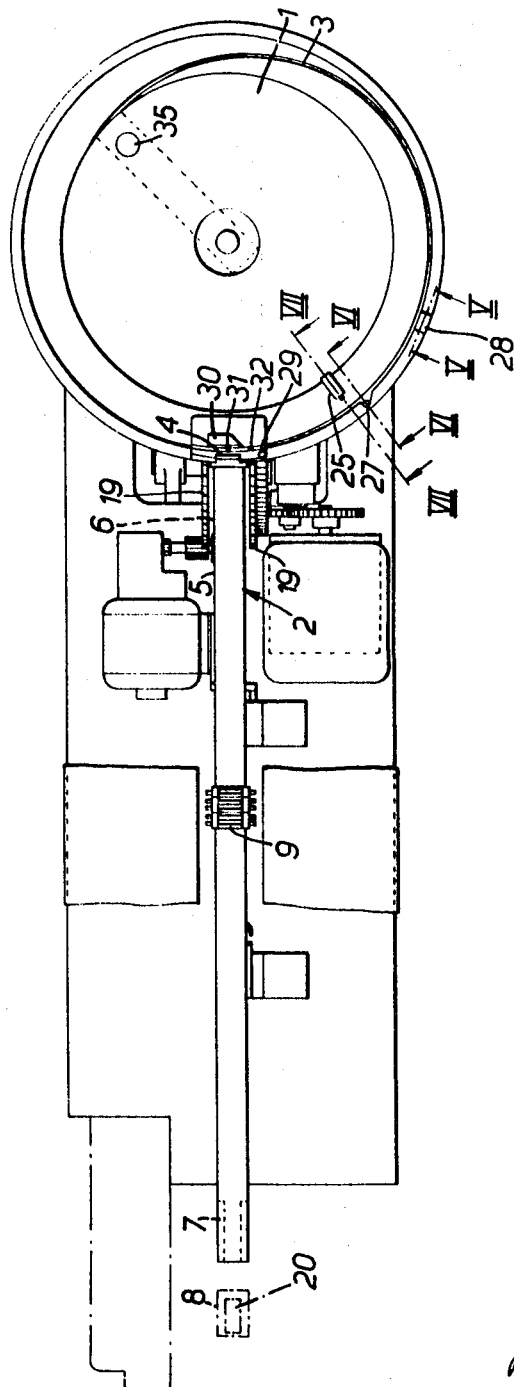

United States Patent

[11] 3,604,550

| [72] | Inventors | Peter Martin Zollman<br>Weybridge;<br>Julian Pascoe Grenfell, Weybridge; David John Brown, New Malden, all of, England |
| --- | --- | --- |
| [21] | Appl No | 852,394 |
| [22] | Filed | Aug. 22, 1969 |
| [45] | Patented | Sept. 14, 1971 |
| [73] | Assignee | Badalex Limited<br>Weybridge, Surrey, England |

[54] ARTICLE DELIVERY APPARATUS
8 Claims, 7 Drawing Figs.

[52] U.S. Cl. ................................. 198/21,
198/106
[51] Int. Cl. ........................... B65g 37/00,
B65g 47/42

[50] Field of Search ....................... 198/21, 85.
106; 53/74, 246, 214/301

[56] References Cited
UNITED STATES PATENTS
2,978,854  4/1961  Fairest.                    53/246

Primary Examiner — Edward A. Sroka
Attorneys — Laubscher & Sixbey and Lawrence E Laubscher ABSTRACT: A delivery apparatus for delivering articles in a timed relation at a delivery station from a supply station to which the articles are delivered at random time interval. the apparatus including a conveyor for carriers, a loading control to randomly release loaded carriers for movement by the conveyor, and delivery device for receiving the conveyors and delivering the articles therein at predetermined intervals.

ARTICLE DELIVERY APPARATUS

This invention is concerned with improvements in and relating to article delivery apparatus which will provide from a supply which is random timewise a delivery which is regular.

It has been proposed to manually load individual cathodes to mount mills and to manually load individual cathodes at spaced positions on conveyors when delivered at regular intervals to mount mills. To reduce the labor contact it has been proposed to mechanically deliver at regular intervals to a conveyor for regular delivery to the mills. However, cathodes are small, have a tendency to tangle and are difficult to deliver at regular intervals straight from a supply source except by hand.

According to the present invention there is provided an article delivery apparatus having a conveyor movable regularly between a supply station and a delivery station, a plurality of carriers engaged by the conveyor and movable relative thereto, a carrier-loading control element at the supply station operable to hold a carrier at that station until loaded and a carrier delivery control element to receive carriers released by the loading control element and moved therefrom by the conveyor and to present carriers at predetermined intervals to the delivery station, the conveyor being operable at a speed greater than that corresponding to the rate of presentation of the carriers to the delivery station.

It will be apparent that so long as the carrier supply station maintains an article supply at a rate equal to the delivery rate over a period of time and a queue of loaded carriers is created at the delivery control element, then the supply can be random to the extent of the interval represented by the unloading of the carriers awaiting action by the delivery control element.

The invention has particular application to the delivery of cathodes or filaments to mount mills for assembly of electric lamps.

Figure 2:
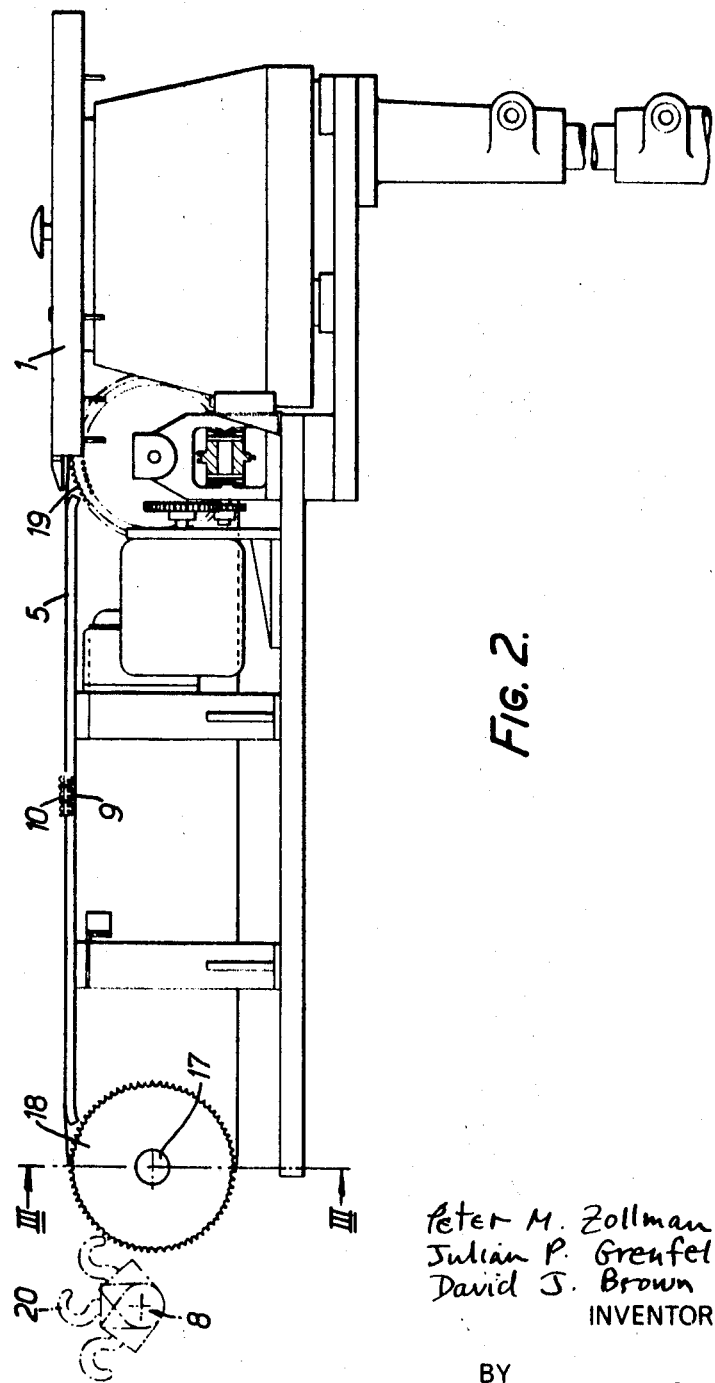
Figure 3:
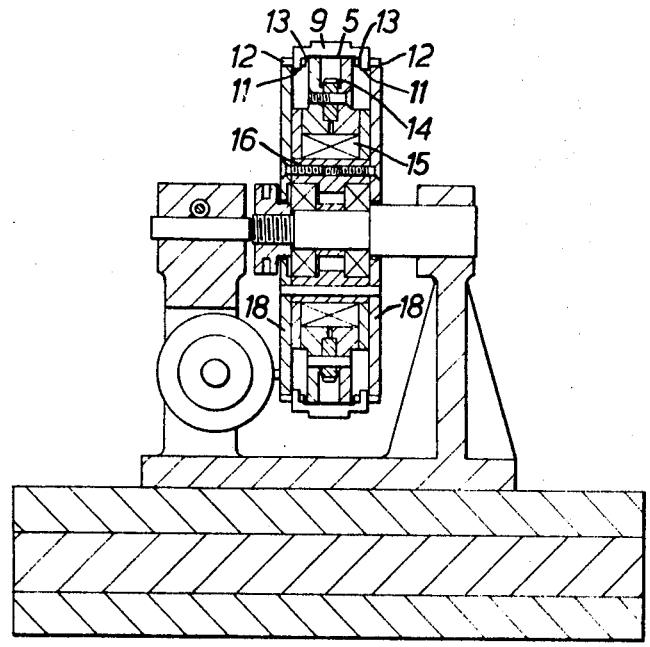
Figure 4:
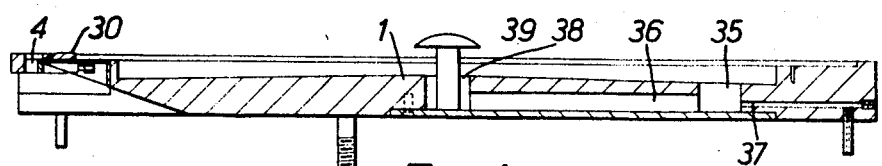
Figure 5:
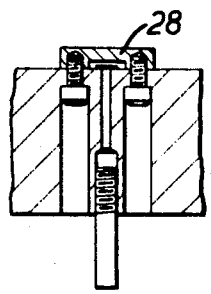
Figure 6:
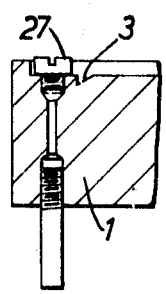
Figure 7:
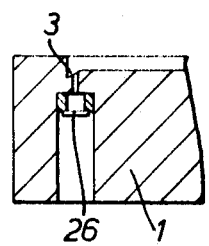

In order that the invention may be well understood there will now be described one embodiment, given by way of example only, of article delivery apparatus according to the invention for use with a mount mill, reference being had to the accompanying drawings in which:

FIG. 1 is a schematic plan view of the apparatus;
FIG. 2 is a schematic elevation of the apparatus:
FIG. 3 is an enlarged section on the line III—III of FIG. 2;
FIG. 4 is a section through the vibrator table, and
FIGS. 5, 6 and 7 are scrap sections along lines V—V, VI—VI and VII—VII respectively of FIG. 1.

The delivery apparatus comprises a vibrator table 1 and a conveyor 2. The table 1 has a track 3 into which articles, in this case filaments, gravitate and along which they will move, unless diverted, to a point adjacent a discharge opening 4 and, if not discharged, they will travel on.

The conveyor comprises an endless belt 5 extending about two pairs of wheels 6, 7 located respectively adjacent the discharge opening and at a position adjacent a mount mill here indicated at 8. Engaging the belt 5 are a number of carriers 9 in the form of boats having a pair of V-section open-ended grooves 10, and a pair of flanges 11 each carrying a pair of outwardly projecting index pins 12 and a pair of inwardly projecting belt engaging pins 13. The wheels 6 are chain driven through a sprocket 14 on bearings 15 carried by a hub 16. This hub and a corresponding hub 17 carrying idler wheels 7, carry respectively sprocket wheel pairs 19, 18. The sprocket wheel pair 18 is driven in synchronism with the drive of the mount mill so that each time a mount mill pickup member 20 moves to the position shown in FIG. 2 a groove is in the delivery position to present a filament to the pickup. The other sprocket wheel pair 19 is controlled, as will appear, by circumstances at the vibrator table.

The table periphery has a first light source 25 directed on to a light sensitive element 26 in the track which is one filament length away from an air nozzle 27 adjustable as to height above the track and angle relative to the track. Upstream of this nozzle 27, i.e. counterclockwise therefrom as viewed in FIG. 1, is a nozzle block 28 which will give a constant thin flat jet of air at a height above the track slightly greater than the height of the top of a filament in the track. Downstream of nozzle 27 is a like nozzle 29 itself upstream of a block 30, on the opposite side of the track from the block being the discharge opening 4. A pair of light sources, not shown, are directed at a pair of light guides 31, 31 which extend to a pair of photoelectric cells. The cell of the upstream light guide being operable upon arrival of an article to discharge a jet from nozzle 29, which is one filament length away from that light guide, to act as a second guard against articles being fed forward too close together. The cell of the downstream light guide will discharge an air jet from a slot in the lower part of the radially outwardly directed face of the block 30 and this jet will blow an article off the track through the discharge opening.

The operation of the apparatus comprises feeding filaments randomly on to the table 1. Here some will gravitate to the track but others will gravitate to an aperture 35 leading to a radial passage 36 into which a stream of air discharges from a conduit 37. This stream carries the filaments to and up a central passage 38, against a baffle 39 and out on to the table. Such treatment will separate most forms of entanglement. The filaments on the track pass the first flat air jet from nozzle block 28 will will eject back to the table any pair of filaments which have locked together in a fashion which results in an increased height. Thereafter each filament passes the first light source, the associated photoelectric cell of which will operate a valve controlling nozzle 27 to clear any immediately following filament off the track. When a filament reaches the second and third light sources respectively, the nozzle 29 will clear any immediately following filament which evaded the jet from nozzle 27 while the slot nozzle in the block 30 will blow the filament through discharge opening 4.

The conveyor belt 5 is continuously travelling and any boats on the lower run will be moved to a position adjacent sprocket wheel pair 19 which will engage the outwardly projecting fingers 12. Initially the wheel pair 29 is loaded with boats and is static until the cell 31 is activated by an article arrived at the discharge opening. Such indication will operate the valve controlling the nozzle in block 30 to blow the filament through the opening 4 on to a boat and will cause the drive mechanism to index forward the wheel pair 19 by one boat groove. Loaded boats are released one by one as the wheel pair 19 indexes round and the released boats are picked up by the belt 5 which has meanwhile been running through these boats. The belt carries the loaded boats to the wheel pair 18 where a queue of loaded boats is allowed to accumulate before the mount mill starts to operate. The conveyor belt 5 is continuously travelling and any boats on the upper run will be moved to a position adjacent the sprocket wheel pair 18 which will engage outwardly projecting fingers 12. The wheel pair 18 indexes synchronously with the pickup, thus taking the boats to the lower run. When the mount mill operates, the pickup 20 moves to grip a filament in a boat groove and to carry the filament to an assembly position.

In this embodiment a supply, random as to orientation, is fed at random intervals of time in a common orientation to the delivery apparatus which presents the articles at regular intervals at a delivery station.

It will be understood that various modifications may be made to the delivery apparatus and in particular in place of the light sources and light-sensitive devices there may be used electrical probes for ascertaining the presence of or length of a filament.

We claim:

1. An article delivery apparatus comprising:
   a conveyor movable regularly between a supply station and a delivery station,
   a plurality of carriers engaged by the conveyor and movable relative thereto,
   a carrier loading control element at the supply station operable to hold a carrier at that station until loaded, and a carrier delivery control element to receive carriers released by the loading control element and moved therefrom by the conveyor and to present carriers at predetermined intervals to the delivery station, said conveyor being operable to advance said carriers at a speed greater than that at which said carriers are delivered by said delivery control element to the delivery station.

2. An article delivery apparatus according to claim 1 in which the carrier-loading control element comprises a sprocket the teeth of which are engageable by the carriers, the sprocket being indexable in response to loading of an article.

3. An article delivery apparatus according to claim 2 in which the carrier delivery control element comprises a delivery sprocket the teeth of which are engageable by carriers delivered thereto by the conveyor, the delivery sprocket being indexable according to a predetermined timing.

4. An article delivery apparatus according to claim 3 in which the conveyor is a belt conveyor and the carriers each comprise a receptacle, a downwardly directed surface of which is engageable by the conveyor, and pin means which are engageable by the sprockets.

5. An article delivery apparatus according to claim 1 in which the supply device comprises a vibratory table.

6. An article delivery apparatus according to claim 1 in which a sensing element is operable to direct a jet on to an article sensed at the outlet to blow the article through the outlet.

7. An article delivery apparatus according to claim 6 in which at least one further article-sensing device is positioned upstream of an article path to the outlet operable to actuate an article ejector upon sensing an article in a predetermined position relative to a preceding article.

8. An article delivery apparatus according to claim 6 in which the loading control element responds to sensing of an article by the sensing device.